United States Patent [19]
Ishido et al.

[11] 3,856,777
[45] Dec. 24, 1974

[54] METHOD OF PRODUCING PYRIMIDINE NUCLEOSIDE DERIVATIVES

[75] Inventors: Yoshiharu Ishido, Kanagawa-ken; Teruo Yoshino, Saitama-ken; Hajime Komura; Katsumi Suzuki, both of Tokyo; Akihiro Yamasaki; Masaru Okutsu, both of Kanagawa-ken, all of Japan

[73] Assignee: Ajinimoto Co., Inc., Tokyo, Japan

[22] Filed: Dec. 11, 1972

[21] Appl. No.: 313,936

[30] Foreign Application Priority Data
Dec. 14, 1971 Japan.............................. 46-101289

[52] U.S. Cl.......................................... 260/211.5 R
[51] Int. Cl............................................ C07d 51/52
[58] Field of Search ............................ 260/211.5 R

[56] References Cited
UNITED STATES PATENTS
3,463,850   8/1969   Shen et al. ................... 260/211.5 R
3,705,147  12/1972   Robins et al. ................ 260/211.5 R Primary Examiner—Johnnie R. Brown
Attorney, Agent, or Firm—Hans Berman; Kurt Kelman

[57] ABSTRACT

Uridine, cytidine, and derivatives thereof arrived at by substitution in positions 4, 5 and 5' are converted to the corresponding 2,2'-anhydro compounds by reaction with cyclic lower alkylene and alkenylene esters of carbonic acid. The anhydro compounds are hydrolyzed to arabinofuranosylpyrimidine derivatives in a basically known manner. The latter as well as the anhydro compounds are known physiologically active agents and/or intermediates in the synthesis of such agents.

4 Claims, No Drawings

METHOD OF PRODUCING PYRIMIDINE NUCLEOSIDE DERIVATIVES

This invention relates to 2,2'-anhydro-uridines and the corresponding cytidine derivatives, and particularly to a method of producing such pyrimidine derivatives and to their further conversion to arabinofuranosyl-pyrimidine derivatives.

It has been found that pyrimidine derivatives of the formula

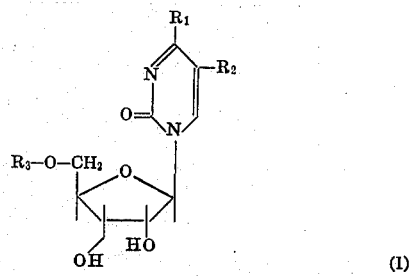

(I)

wherein $R_1$ is hydroxy, mercapto, amino, acetylamino, or monolower-alkylamino, $R_2$ is hydrogen, hydroxy, halogen, or lower alkyl, and $R_3$ is hydrogen, lower alkanoyl, or $H_2PO_3$ in the form of the free bases, free acids, or salts of said bases and acids, are converted by reaction with cyclic lower-alkylene and lower alkenylene esters of carbonic acid at temperatures between about 100° and 200°C in good yields to compounds of the formula

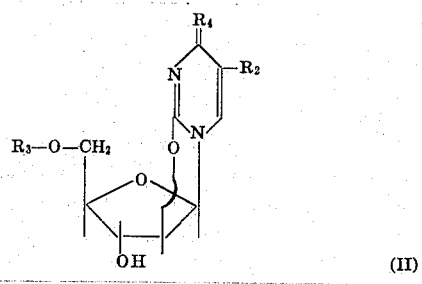

(II)

wherein $R_2$ and $R_3$ are as defined above, and $R_4$ is oxygen, sulfur, imino, acetylimino, or lower-alkylimino.

The compounds of the Formula II may be hydrolyzed in a conventional manner to arabinofuranosylpyrimidine derivatives of the formula

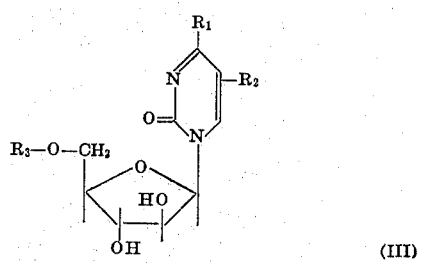

(III)

wherein $R_1$, $R_2$, $R_3$ are as defined above.

The compounds of formulas (II) and (III) are known physiologically active agents and/or intermediates in the synthesis of such agents. (Hoshi, A., et al., GANN, 63, 353 (1972)).

As will be evident from Formula (I), the starting materials for the method of the invention include uridine, cytidine, and derivatives of the same such as 4-thiouridine, the four 5-halouridines, 5-methylcytidine, $N^4$-acetylcytidine, $N^4$-methylcytidine, the four 5-halocytidines, and the 5'-phosphoric acid esters of the afore-mentioned compounds. The bases embraced by best yield in terms of the pyrimidine derivative, and the term "approximately equivalent," as applied to the reactants, will be understood to embrace such small excess amounts.

The reaction takes place fastest and with the best yields at temperatures between approximately 100° and 200°C, and may be performed conveniently in the presence of an inert solvent boiling in the preferred range so that the reaction temperature can be controlled by refluxing the mixture. Dimethylformamide and diacetylformamide, therefore, are suitable solvents. In some instances, the reaction is promoted by acetic anhydride or sodium carbonate as catalysts.

The compounds of Formula (II) are insoluble in many orgainc solvents, and can be precipitated from the reaction mixture by the addition of such organic solvents. They may be further purified by recrystallization and/or treatment with ion exchange resins or active carbon.

If it is desired to produce compounds of the Formula (III), it is not necessary to recover the intermediates of Formula (II), but the mixture resulting from the initial dehydration reaction may be diluted with water and made acid or alkaline to promote the hydrolysis which leads to the arabinofuranosylpyrimidine derivatives either at room temperature (15° to 25°C) or at moderately elevated temperature.

The following Examples are further illustrative of the method of the invention:

Example 1

A mixture of 5 g uridine and 2.5 g ethylene carbonate was heated at 150°C for 2 hours in an oil bath. The reaction mixture was cooled to room temperature and 10 ml ethanol was added. The precipitated solid was recrystallized from 15 ml methanol containing 25 percent water and then consisted of 3.3 g pure 2,2'-anhydrouridine (74% yield). It was identified by elementary analysis and had the physical properties listed below.

| | | |
|---|---|---|
| Calculated for $C_9H_{10}N_2O_5$: | 47.75% C 4.64% H | 12.38% N |
| Found: | 47.77    4.47 | 12.38 |
| Melting point: | 238° – 244°C | |
| UV absorption spectrum: | | |
| $\max^{pH\ 1}$ | 222 and 249 m$\mu$ | |
| $\min^{pH\ 1}$ | 211 and 233 m$\mu$ | |

Example 2

5 g Uridine and 2.5 g ethylene carbonate were dissolved in 10 ml N,N-dimethylformamide, and the solution was refluxed for 40 minutes. After cooling, the reaction mixture was poured into 50 ml ethanol, and the resulting crystalline precipitate was recovered by filtration. It was purified as in Example 1. The needle-shaped crystals so obtained consisted of pure 2,2'-anhydrouridine and weighed 3 g (67 percent yield).

Example 3

A mixture of 0.42 g 5'-uridylic acid triethylamine salt and 0.6 g ethylene carbonate was heated at 150°C for 90 minutes in an oil bath. The reaction mixture was passed through a column of Dowex 1 X4 (formic acid type), and the effluent was evaporated in a vacuum to obtain 0.45 g 2,2'-anhydrouridylic acid.

Formula (I) may be employed in the reaction in the free form and as the salts of suitable acids, and the phosphoric acid esters may be employed in the form of their salts with alkali metals and amines, the triethylamine, tributylamine, and morpholine salts, for example, having convenient properties.

The term "lower alkyl" and analogous terms, such as "lower alkanoyl," as employed in this specification and the appended claims, will be understood to cover compounds having a carbon chain of not more than four atoms.

The dehydrating agents employed in converting the compounds of Formula (I) into compounds of Formula (II) thus include, but are not limited to, the cyclic ester of ethylene glycol with carbonic acid, hereinafter referred to as ethylene carbonate, and the corresponding propylene carbonate and vinylene carbonate. The amount of pyrimidine derivative of Formula (I) which is converted to the corresponding compound of Formula (II) is slightly less than the stoichiometric equivalent of the alkylene or alkylenyl carbonate so that it is preferred to employ a small excess of the carbonate for

Example 4

A mixture of 2.8 g cytidine hydrochloride and 4.4 g ethylene carbonate was heated at 150°C for 50 minutes in an oil bath. The reaction mixture was dissolved in 20 ml water, and the solution was passed through a column packed with active charcoal. Then water was passed through the column to elute 2,2'-anhydrocytidine hydrochloride. About 2 liters of the eluate were evaporated to dryness in a vacuum at 40° to 50°C. The residue was recrystallized from a 1:1 mixture of water and ethanol. The columnar crystals obtained consisted of pure 2,2'-anhydrocytidine hydrochloride and weighed 1.33 g (51 percent yield). The compound was identified by elementary analysis and had the physical properties listed below.

| | | | |
|---|---|---|---|
| Calculated for $C_9H_{12}N_3O_4Cl$: | 41.28% C | 4.63% H | 16.05% N |
| Found: | 41.38 | 4.83 | 16.10 |
| Melting point: | 240° – 260°C (decomposed) | | |
| UV absorption spectrum: | | | |
| $max^{pH\ 1-6}$ | 232 and 262 m$\mu$ | | |
| $min^{pH\ 1-6}$ | 218 and 242 m$\mu$ | | |

Example 5

4.24 g 5'-Cytidylic acid triethylamine salt and 4.4 g ethylene carbonate were dissolved in 10 ml dimethylacetamide, and the solution was refluxed for 30 minutes. The reaction mixture was passed through a first column containing 200 ml Dowex 1 × 4 (formic acid type), and the column was washed with water. The combined effluent and washing water were passed through a second column packed with 50 ml active charcoal and eluted with water. The eluate was evaporated in a vacuum to obtain 0.4 g 2,2'-anhydrocytidine formic acid salt. The material still absorbed on the Dowex 1 × 4 in the first column was eluted with 0.2 M formic acid and the first portion of the eluate containing 2,2'-anhydrocytidine-5'-phosphoric acid was evaporated in a vacuum to obtain 0.8 g of the colorless, powdery anhydrocytidylic acid derivative.

Example 6

2.26 g 2,2'-Anhydrouridine was dissolved in 50 ml aqueous 1 N sodium hydroxide, and the solution was stirred for 2 hours at room temperature. When the absorption maximum in the ultraviolet spectrum of a sample reached 261 $\mu$, the reaction mixture was neutralized by adding Amberlite IR-120 (H type). The ionexchange resin was filtered off, and the filtrate was evaporated to 1.7 g solid 1-$\beta$-D-arabinofuranosyluracil (70.5 percent yield). The ultraviolet absorption spectrum and the melting point of the crystalline material were identical with corresponding properties of a known sample.

Example 7

2.62 g 2,2'-Anhydrocytidine hydrochloride were dissolved in 80 ml aqueous 0.1 N sodium hydroxide, and the solution was allowed to stand at room temperature for 2 hours. When the absorption maximum in the ultraviolet spectrum had reached 272 $\mu$, the reaction mixture was adjusted to about pH 2 by adding 1 N hydrochloric acid and evaporated to dryness in a vacuum.

The residue was extracted with 100 ml hot methanol, and the extract was evaporated in a vacuum. The residue was recrystallized from a small amount of water to obtain 1.65 g 1-$\beta$-D-arabinofuranosylcytosine hydrochloride (68 percent yield).

Example 8

0.285 g $N^4$-Acetylcytidine and 0.44 g ethylene carbonate were heated in a 10 ml flask for 2 hours in an oil bath maintained at 140°C. The reaction mixture was worked up as in Example 4 to obtain 0.13 g 2,2-anhydrocytadine acetate in the form of columnar crystals.

Example 9

0.147 g $N^4$-Methylcytidine hydrochloride and 0.13 g ethylene carbonate were heated in a small flask for 30 minutes at 150°C in an oil bath. Ethanol was added to the reaction mixture, and the solution was evaporated to obtain 0.11 g crystalline 2,2-anhydro-$N^4$-methylcytidine hydrochloride (70 percent yield). The UV spectrum of the compound showed values of $max^{pH\ 6}$ at 243 and 267 $\mu$.

While ethylene carbonate was employed as a dehydrating agent in illustrative Examples 1 to 6 and 9, the other cyclic alkylene carbonates and the alkylenyl carbonates having up to four carbon atoms in their alcohol moiety produced closely analogous or identical results when employed in equimolecular amounts.

The reaction was not significantly affected when uridine and cytidine and their 5'-phosphoric acid esters were substituted in positions 4 and/or 5 within the limits set forth above, as is partly evident from Examples 8 and 9. Thus, 4-thiouridine, 5-fluoro-, 5-chloro-, 5-bromo-, and 5-iodouridine and the corresponding 5-halocytidines, 5-methylcytidine and its higher homologs up to 5-n-butylcytidine, and the corresponding derivatives of uridylic and cytidylic acid were converted to the expected anhydropyrimidine derivatives from which the arabinofuranosylpyrimidine derivatives could be produced in a manner obvious from Examples 6 and 7.

What is claimed is:

1. A method of producing a pyrimidine derivative which comprises:

reacting a compound of the formula

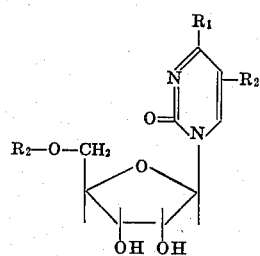

with an approximately equivalent amount of a cyclic alkylene or alkylenyl ester of carbonic acid at approximately 100° to 200°C until a 2,2'-anhydro derivative of said compound is formed, said anhydro derivative being of the formula

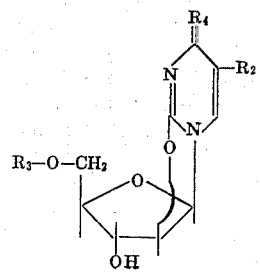

in said formulas: $R_1$ being hydroxy, mercapto, amino, acetylamino, or monoalkylamino, $R_2$ being hydrogen, hydroxy, halogen, or alkyl, $R_3$ being hydrogen, alkanoyl, or $H_2PO_3$, and $R_4$ being oxygen, sulfur, imino, acetylimino, or alkylimino, said alkyl, alkanoyl, alkylene, and alkylenyl having not more than four carbon atoms.

2. A method as set forth in claim 1, wherein said 2,2'-anhydro derivative is recovered in substantially pure form after said forming thereof.

3. A method as set forth in claim 1, wherein said compound is reacted with said ester of carbonic acid in the presence of dimethylformamide or diacetylformamide as a solvent substantially at the boiling temperature of said solvent.

4. A method as set forth in claim 1, wherein said carbonic acid ester is ethylene carbonate, propylene carbonate, or vinylene carbonate.

* * * * *

UNITED STATES PATENT OFFICE
CERTIFICATE OF CORRECTION

Patent No. 3,856,777    Dated December 24, 1974

Inventor(s) YOSHIHARU ISHIDO ET AL

It is certified that error appears in the above-identified patent and that said Letters Patent are hereby corrected as shown below:

In the heading, line [73], change "Ajinimoto" to --

Ajinomoto --.

Signed and sealed this 18th day of February 1975.

(SEAL)
Attest:

RUTH C. MASON
Attesting Officer

C. MARSHALL DANN
Commissioner of Patents
and Trademarks